United States Patent
Meredith

(10) Patent No.: US 7,376,547 B2
(45) Date of Patent: May 20, 2008

(54) SYSTEMS AND METHODS THAT FACILITATE QUANTUM COMPUTER SIMULATION

(75) Inventor: Lucius G. Meredith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/903,205

(22) Filed: Jul. 30, 2004

(65) Prior Publication Data

US 2005/0182614 A1 Aug. 18, 2005

Related U.S. Application Data

(60) Provisional application No. 60/544,114, filed on Feb. 12, 2004.

(51) Int. Cl.
  *G00F 9/44* (2006.01)
  *G06F 7/60* (2006.01)
(52) U.S. Cl. ............................................. 703/21; 703/2
(58) Field of Classification Search .................. 703/21, 703/2; 706/14, 21
  See application file for complete search history.

(56) References Cited

U.S. PATENT DOCUMENTS

| | | | |
|---|---|---|---|
| 5,530,263 A | 6/1996 | DiVincenzo | |
| 5,793,091 A | 8/1998 | Devoe | |
| 6,218,832 B1 | 4/2001 | Chuang et al. | |
| 6,495,854 B1 | 12/2002 | Newns et al. | |
| 6,578,018 B1* | 6/2003 | Ulyanov | 706/14 |
| 6,649,929 B2 | 11/2003 | Newns et al. | |
| 2005/0166193 A1* | 7/2005 | Smith et al. | 717/143 |
| 2005/0273306 A1* | 12/2005 | Hilton et al. | 703/11 |
| 2006/0224547 A1* | 10/2006 | Ulyanov et al. | 706/62 |

OTHER PUBLICATIONS

"QCE: A Simulator for Quantum Computer Hardware", Kristel Michielsen, Hans De Raedt, Aug. 28, 2003.*
S.L. Braunstein. Quantum Computation: A Tutorial. 26 pages. Last modified on Aug. 23, 1995. http://www-users.cs.york.ac.uk/~schmuel/comp/comp.html.
IBM's Test-Tube Quantum Computer Makes History. IBM Research News, Dec. 19, 2001. 4 pages. http://www.research.ibm.com/resources/news/20011219_quantum.shtml.

(Continued)

*Primary Examiner*—Paul Rodriguez
*Assistant Examiner*—Nithya Janakiraman
(74) *Attorney, Agent, or Firm*—Amin, Turocy & Calvin, LLP

(57) ABSTRACT

The present invention provides systems and methods that facilitate simulating quantum computing and/or provide a language to program a quantum computer. The systems and methods translate received computer instructions (e.g., quantum computer based instructions) to a process algebra (e.g., rho and pi calculus) representation that can be executed by a classical computer to produce a result indicative of a quantum computer. Such mapping can include transformations between vectors, scalars, dual vector and operators in Hilbert space to processes, named processes (quoted names) and quote maps in rho calculus space. Thus, the systems and methods of the present invention can transform a classical computer into a quantum computer simulator. In addition, this process algebra representation can be executed on a quantum computer; thus, the representation can additionally be utilized as a computer language to program a quantum computer.

17 Claims, 11 Drawing Sheets

OTHER PUBLICATIONS

K. Bonsor. How Quantum Computers Will Work. 3 pages. Last Viewed on Aug. 17, 2004. http://computer.howstuffworks.com/quantum-computer.htm/printable.

J. West. The Quantum Computer: An Introduction. 5 pages. Last Modified on May 31, 2000. http://www.cs.caltech.edu/~westside/quantum-intro.html.

J. Wallace. Quantum Computing: A Review Version 2.0. University of Exeter Department of Computer Science Technical Report 387, Oct. 1999. 18 pages.

K. Obenland and A. Despain. Models to Reduce the Complexity of Simulating a Quantum Computer. Information Sciences Institute Tech. Report, Nov. 1997. 26 pages.

* cited by examiner

SYSTEMS AND METHODS THAT FACILITATE QUANTUM COMPUTER SIMULATION

CROSS-REFERENCE TO RELATED APPLICATION(S)

This application claims the benefit of U.S. Provisional Patent Application Ser. No. 60/544,114 filed on Feb. 12, 2004, and entitled "COMPUTATION OF STRUCTURE AND INTERACTIONS OF MATTER," the entirety of which is incorporated herein by reference.

TECHNICAL FIELD

The present invention generally relates to quantum computing, and more particularly to systems and methods that generate computer readable instructions that can be executed by a classical physics based computer to simulate a quantum computer.

BACKGROUND OF THE INVENTION

Although the classical computer (a computer based on classical physics) has evolved from a relatively large, low performance and expensive number cruncher to a compact, high performance and cost effective computing engine, the modern day classical computer is fundamentally no different from first generation classical computers. By way of example, today and yesterday's classical computers simply manipulate and interpret an encoding of binary bits to produce a useful computational result. In general, a binary bit is a fundamental unit that is classically represented as "0" or "1," wherein a series of such bits can be utilized to encode information. The series of bits (or encoded information) generally is manipulated via Boolean logic (e.g., logic gates such as AND, OR, etc.) to produce useful results. This classical physics notion of a binary bit of information can be physically realized through a macroscopic physical system such as magnetization on a hard disk or charge on a capacitor.

Whereas the classical computer obeys the laws of classical physics, a quantum computer leverages physical phenomenon unique to quantum mechanics to render a new paradigm of information processing. In the quantum mechanics paradigm, the fundamental unit of information is a quantum bit, or qubit. With quantum computers, qubits are manipulated by executing a series of quantum gates, which are each a unitary transformation acting on a single qubit or pair of qubits. By applying quantum gates in succession, a quantum computer can perform a computationally complicated unitary transformation to a set of qubits in some initial state. Unlike the bit of classical physics, the qubit is not binary, but rather more quaternary in nature. This property arises as a consequence of its adherence to the laws of quantum mechanics, which substantially differ from the laws of classical physics. By way of example, a qubit can exist not only in a state corresponding to a logical state of "0" or "1," like a classical bit, but additionally in states corresponding to a superposition of the classical states. Thus, a qubit can exist as "0," "1," or simultaneously as both "0" and "1," with a numerical coefficient representing a probability for each state.

This notion of a superposition of states theoretically provides computational leaps (orders of magnitude) over the classical computer. By way of example, a quantum system of 500 qubits represents a quantum superposition of as many as $2^{500}$ states. In classical physics, these states essentially are equivalent to a single list of 500 "1's" and "0's." Thus, any quantum operation on this quantum system would simultaneously operate on all $2^{500}$ states (state machines) with each clock cycle. This is essentially equivalent to performing the same operation on a classical computer employing $\sim 10^{150}$ separate processors. Thus, theoretically the quantum computer demonstrates superior computational power over the classical computer.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods that facilitate simulating quantum computing and/or provide a language to program a quantum computer. The present invention provides a novel technique, wherein quantum computing can be simulated via a classical (physics based) computer. The systems and methods translate computer readable instructions (e.g., quantum computer based instructions) to a process algebra representation that can be executed by a classical computer to produce a result indicative of a quantum computer; examples of suitable process algebra include rho ($\rho$) and pi ($\pi$) calculus. Thus, the systems and methods of the present invention can transform a classical computer into a quantum computer simulator that can compute within and leverage the benefits of the quantum physics domain. In addition, the process algebra representation can be executed on a quantum computer; thus, the representation can additionally be utilized as a computer language to program a quantum computer.

In one aspect of the present invention, a system is provided that comprises a simulator that translates instructions into computer readable representations that can be executed by a classical computer to simulate a quantum computer. The system accepts computer instruction generated via essentially any programming language such as machine language, assembly language, C and derivatives of C, Visual Basic, Pascal, FORTRAN, quantum mechanics, etc. These instructions can be utilized to generate a representation of the instructions that can be executed by a classical computer. By way of example, the simulator can generate a process algebra (e.g., rho and/or pi calculus) representation, which is executable by a classical computer. In various aspects of the invention, the system can additionally employ an instruction translator, an instruction mapping component, and/or an instruction converting look up table to facilitate generating the representation. In addition, the representation can be utilized to program a quantum computer. For example, instructions can be converted to the representation, wherein the representation can be edited to modify an instruction and/or utilized to program the quantum computer. In another example, the representation can be generated and converted to quantum mechanics instructions via a mapping, wherein the quantum mechanics instructions are utilized to program the quantum computer.

In another aspect of the invention, methodologies are illustrated that facilitate quantum computing simulation and provide a programming language for a quantum computer. Quantum computing simulation can be performed by translating quantum mechanics based instructions to a process algebra form that can be executed by a classical computer. Such mapping can include translations between vectors, scalars, dual vector and operators in Hilbert space to processes, named processes (quoted names) and quote maps in rho calculus space. This process algebra form can additionally be utilized to program a quantum computer. For example, the process algebra form can be executed by the quantum computer or the process algebra form can be mapped to quantum mechanics instructions, wherein the quantum mechanics instructions are executed by the quantum computer.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
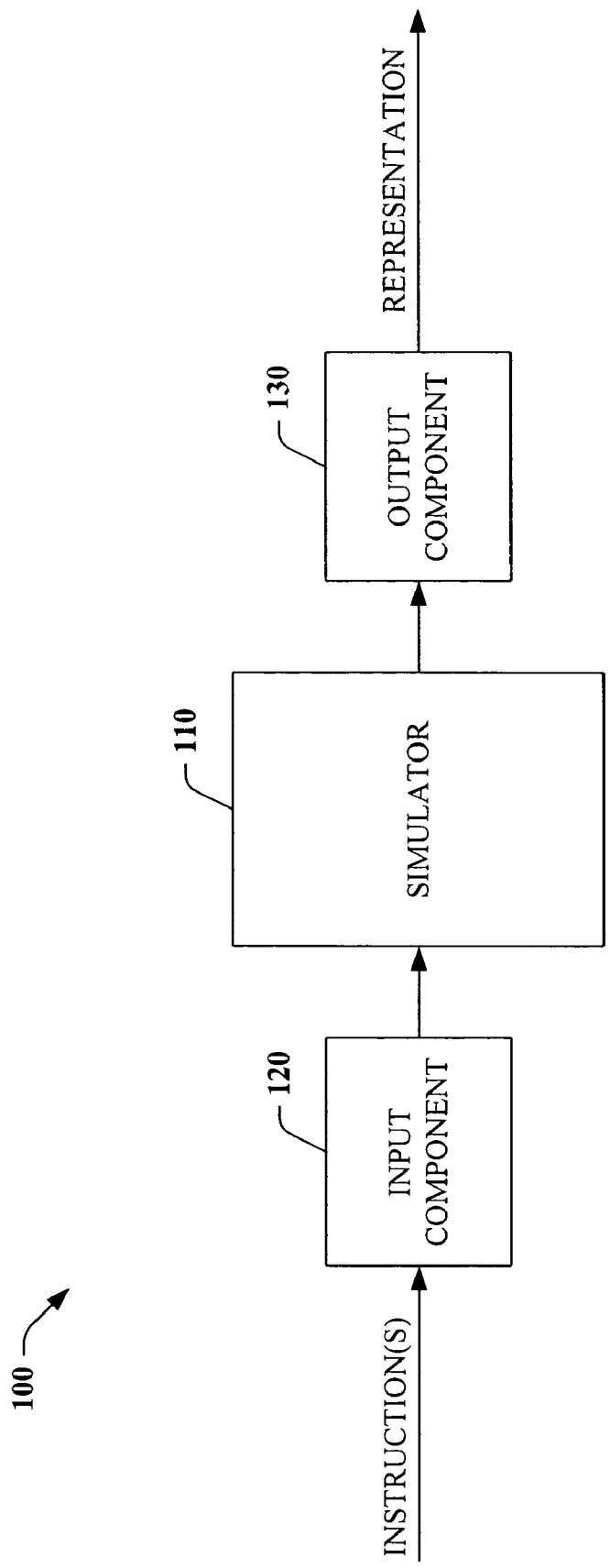
FIG. 1 illustrates an exemplary system that facilitates quantum computing.

The present invention provides systems and methods that simulate quantum computing and/or provide a quantum computer programming language. The present invention provides a novel technique that translates quantum computer based instructions to a representation (e.g., in process algebra) that can be executed on a classical computer to produce a result indicative of a quantum computer. Thus, the systems and methods of the present invention can transform a classical physics based computer into a quantum computer simulator that can operate in the quantum physics domain. In addition, the representation can be utilized as a computer language to program a quantum computer.

As utilized in this application, terms "system," "component," "entity," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates quantum computing. The system 100 can be employed in connection with a classical (physics based) computer to simulate a quantum computer. The system 100 comprises a simulator component (hereafter simulator) 110 that can receive computer readable instructions (e.g., generated via machine language, assembly language, higher-level languages, quantum mechanics, etc.) and generate a representation that can be executed by a classical computer.

The simulator 110 can receive such instructions through an input component 120. For example, computer (readable/executable) instructions can be generated via essentially any programming language (e.g., machine, assembly, C, derivatives of C, Visual Basic, Pascal, Fortran, quantum mechanics, etc.) and/or model and conveyed through the input component 120 to the simulator 110. It is to be appreciated that the input component 120 can be essentially any interface that can couple the simulator 110 with transmission medium through which instructions sets (e.g., one or more instructions) can be transmitted. For example, the input component 120 can be utilized to couple the simulator 110 with a data bus over which instruction sets can be transmitted. In another example, the input component 120 can be utilized to couple the simulator 110 with an address bus. This bus can be utilized to convey an address to a reference or pointer to the simulator 110, wherein the reference or pointer can facilitate locating the instruction set. The simulator 110 can utilize the reference or pointer to retrieve the instruction set. It is to be appreciated that the data and/or address buses can be electrical and/or optical. In addition, the buses can be local or common to the system (e.g., a backplane). Moreover, these buses can provide access to storage medium residing in the machine employing the system 100.

In one instance, at least one computer readable instruction can reside within storage medium of the computer (e.g., classical or quantum) employing the system 100. This instruction can be stored in essentially any storage medium, including volatile memory such as Random Access Memory (RAM) and variations thereof (e.g., Dynamic RAM (DRAM), Static RAM (SRAM), Synchronous DRAM (SDRAM), Fast Page RAM (FP RAM), Extended Data Out DRAM (EDO DRAM), Burst EDO RAM (BEDO RAM), etc.). In addition, the instruction can be stored in non-volatile memory such as hard disk, CD, DVD, Optical disk, Read Only Memory (ROM) and variations thereof (e.g., Programmable ROM (PROM), Erasable Programmable ROM (EPROM), and Electrically Erasable Programmable PROM (EEPROM)), Basic Input/Output System (BIOS), etc.

In another instance, at least one computer readable instruction can reside remotely from the quantum computer simulator 110. Such instruction can be conveyed to the simulator 110 via portable storage (e.g., Flash, CD, DVD, optical disk, floppy disc, etc.) and/or over a network. Utilizing a network can provide instruction conveyance with a remote system. Examples of networks that can be employed in accordance with aspects of the present invention include wire and/or wireless Large Area Networks (LANs), Wide Area Networks (WANs), and emerging specialized networks such as Campus Area Networks (CAN), Metropolitan Area Networks (MANs), and a Home Area Network (HAN), for example. In general, a LAN typically couples workstations, personal computers, printers, copiers, scanners, etc. that reside within a relatively small geographic area such as department, building or group of buildings, and a WAN (e.g., the Internet) typically is associated with networks that span large geographical areas and can include one or more smaller networks (e.g., one or more LANs). A CAN generally is a dedicated network for a limited geographic area, such as a campus or military base; a MAN typically is designed for a town or city; and a HAN commonly is associated with a network within a user's home.

Upon receiving an instruction set, the simulator 110 can generate a representation of the instruction. As noted supra, the received instruction set can include computer readable instructions. In other aspects of the invention, the instruction set can be packaged in a form that is not executable by a classical computer. For example, the instruction set can include quantum mechanics-based instructions. Such instructions can require hardware that typically is not present in a classical computer; classical computers generally are designed around hardware based on the laws of classical physics and not quantum mechanics. Regardless of form, the simulator 110 can generate a representation of the instruction set that can be executed (e.g., after a build) by a classical computer. For example, the simulator 110 can generate a process algebra based representation. By way of example, the simulator can generate a rho and/or pi calculus representation. It is to be appreciated that one of ordinary skill in the art would understand that essentially any process algebra can be utilized in accordance with aspects of the present invention.

The generated representation can be conveyed by the simulator 110 through an output component 130 to virtually any component for further processing. For example, the representation can be provided to a processing unit (e.g., a digital signal processor (DSP), a microprocessor (CPU), etc.), wherein respective instructions can be executed. It is to be appreciated that such processing can provide a result substantially similar to a result generated by a quantum computer and/or predicted through quantum mechanics.

Similar to the input component 120, the output component 130 can be essentially any interface that can couple the simulator 110 with a transmission medium. Thus, the output component 130 can be utilized to couple the simulator 110 with a data and/or address bus and/or network as described above. When employed in connection with a classical computer, the output component 130 can be utilized to convey the representation to a processor and/or other processing resources of the classical computer for storage and/or execution. Similarly, when employed in connection with a quantum computer, the output component 130 can be utilized to convey the representation to a processor and/or other processing resources of the quantum computer for storage and/or execution. However, with a quantum computer the representation can be transformed to a quantum mechanics form prior to execution. It is to be appreciated that the simulator 110, the input component 120 and/or output component 130 can implemented in software, hardware and/or firmware.

The system 100 provides a novel approach to quantum computing. Contemporary quantum computers generally are not realizable in a form that can compete with classical computers. However, the present invention can be utilized to represent quantum computers as well as other instructions in a form that can be read and executed by a classical computer. Thus, the present invention can transform a classical computer into a quantum computer and leverage the benefits of quantum computing while utilizing classical physics based hardware. Moreover, the generated representation can be executed on a quantum computer and, thus, the representation can be utilized as a computer language to program quantum computers.

Figure 2:
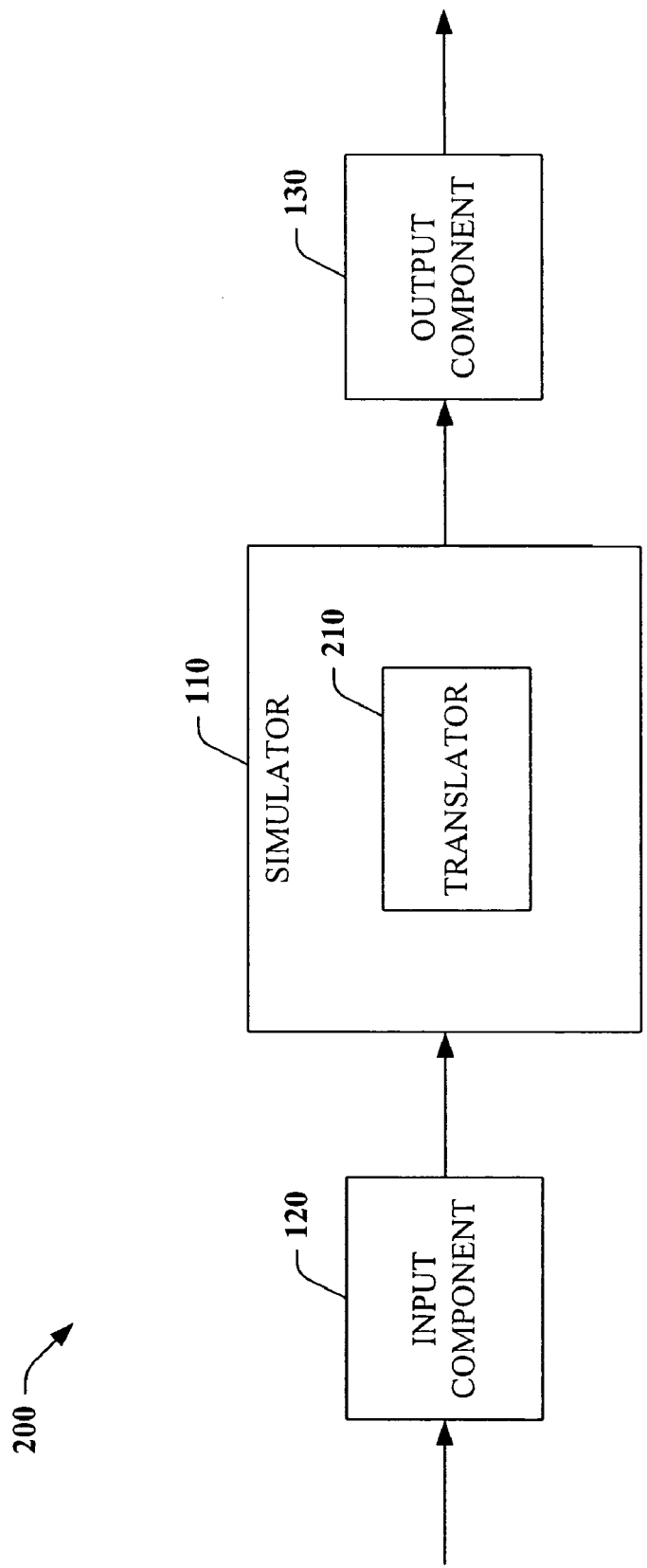
FIG. 2 illustrates an exemplary system that employs a translator to generate a computer readable representation that can execute in a classical computer to produce results indicative of a quantum computer.

FIG. 2 illustrates a system 200 that employs a translator to convert instructions to a computer readable representation that can execute in a classical computer to produce results indicative of a quantum computer. The system 200 comprises the simulator 110, the input component 120, the output component 130, and a translator component (hereafter translator) 210. As described in detail supra, the simulator 110 can receive various computer related instruction sets (e.g., quantum mechanics based instructions) through the input component 120. Such instructions can be processed by the simulator 110 to generate a representation that can be read and/or executed by a classical computer, which can facilitate transforming the classical computer into a virtual quantum computer, or quantum computer simulator.

Upon receiving an instruction set, the simulator 110 can employ the translator 210 to facilitate generating the representation. In one instance, the translator 210 can be utilized to identify a current syntax of the instruction set. For example, the translator 210 can facilitate determining whether the instruction set includes instructions based on a particular programming language and/or model. In another instance, the translator 210 can interpret the instruction set to produce a form (e.g., a phraseology, syntax, grammar, etc.) that can be utilized to generate the computer readable/executable representation or directly to yield the computer readable/executable representation. In yet another instance, the translator 210 can convert, transform, map, etc. the instruction set to the computer readable/executable representation. In other aspects of the invention, the translator 210 can transform the representation or other representation to quantum mechanics based instructions. For example, when utilizing the representation to program a quantum computer, the representation or a translation of the representation to quantum mechanics can be utilized to program the quantum computer.

The translator 210 can optionally include testing and/or debugging capabilities. Thus, after generating the representation, the translator 210 can scrutinize the representation and facilitate resolving any discrepancies. In addition, the translator 210 can include an interface (not shown) that can be utilized to interact with a user. For example, an Application Program Interface (API) can be utilized to provide the user with a visual display of the received instruction sets and/or the representation. The user can utilize the interface to provide information to the translator 210, manually change the representation, override a decision by the translator 210, invoke testing and/or debugging, and/or request the translator 210 attempt a subsequent translation of the received instruction set. In addition, the user can utilize the API to create, modify, and/or delete one or more instructions and/or the representation.

As described previously, the generated representation can be conveyed through the output component 130 for execution and/or further processing, wherein execution can provide a result substantially similar to a result generated by a quantum computer and/or predicted through quantum mechanics, thereby simulating a quantum computer.

Figure 3:
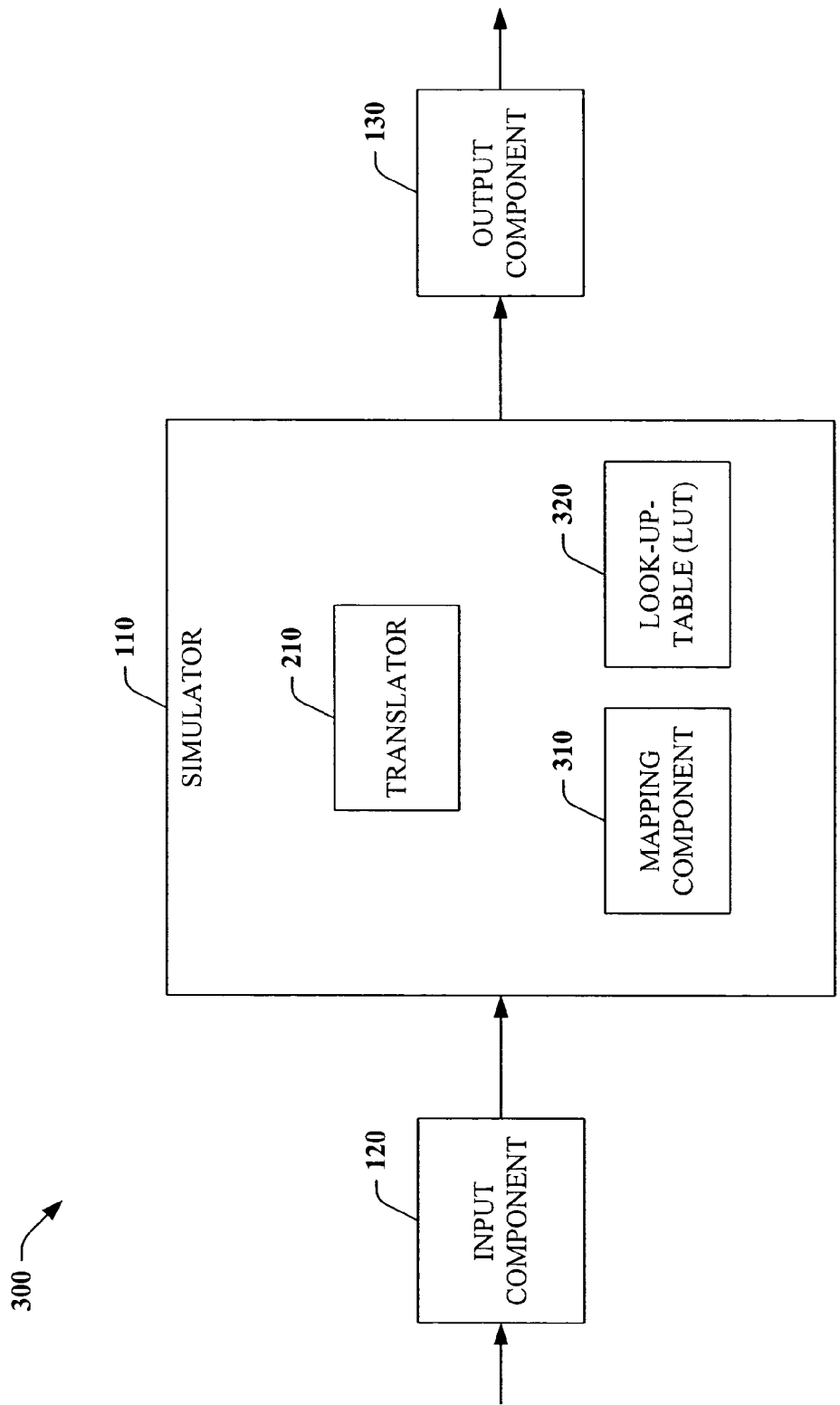
FIG. 3 illustrates an exemplary system that generates a process algebra representation of computer readable instructions for a classical computer.

FIG. 3 illustrates a system 300 that maps instructions to a process algebra representation that can be executed by a classical computer to simulate quantum computing. The system 300 comprises the simulator 110, the input component 120, the output component 130, the translator 210, a mapping component 310 and a look up table (hereafter LUT) 320.

Upon receiving an instruction set via the input component 120, the simulator 110 can invoke the translator 210 to generate a representation of the instruction set that can be executed by a classical computer to simulate a quantum computer. The translator 210 can employ the mapping component 310 to map the instructions in the received instruction set to the representation. For example, the mapping 310 component can search the LUT 320 for information that maps the format of the received instructions to a representation with a desirable format.

In one aspect of the present invention, the representation format can be based on process algebra such as rho, pi, join, ambient, etc. calculus. Thus, the mapping component 310 can search the LUT 320 for information that maps the format of the received instructions to the desired process algebra. It is to be appreciated that this mapping can include mapping quantum physics based instructions in Hilbert space to process algebra space. For example, the look up table can provide mappings from Hilbert space vectors (including dual), scalars, and/or operators to rho calculus processes, names, quote maps, sum of triples, etc. as described in detail below.

Figure 4:
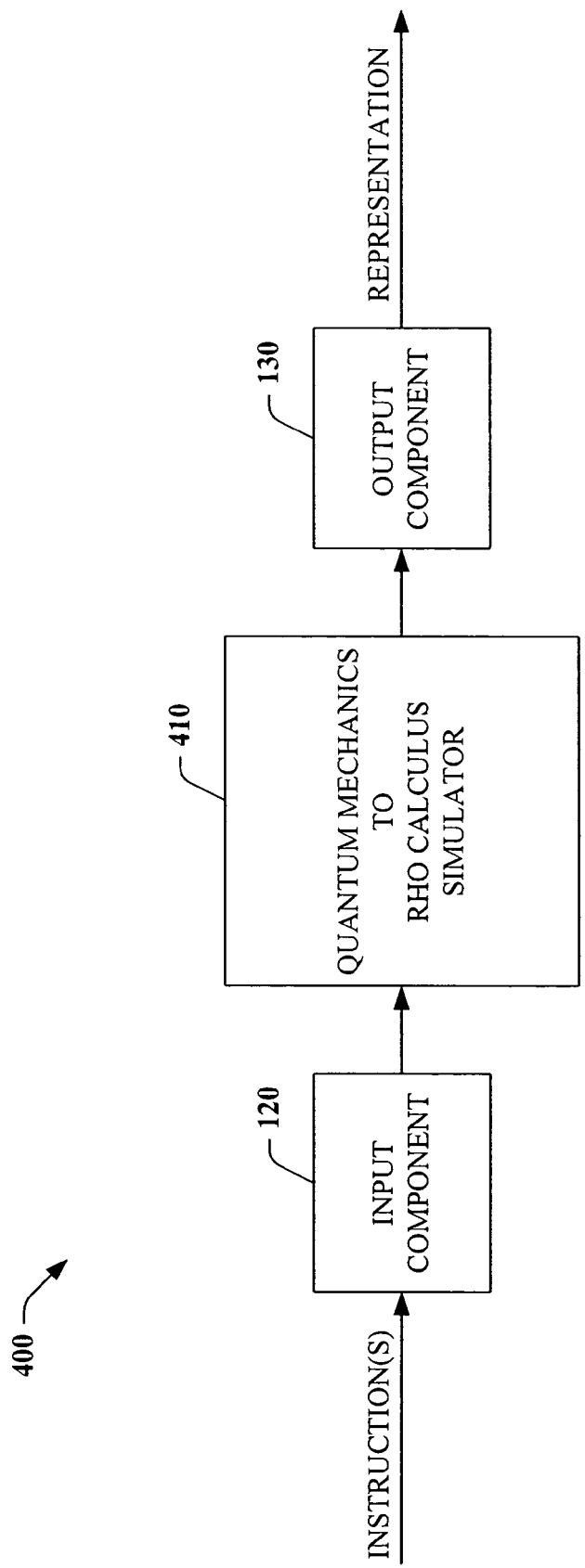
FIG. 4 illustrates an exemplary system that utilizes a mapping between quantum mechanics and rho calculus to facilitate simulating quantum computing.

FIG. 4 illustrates an exemplary system 400 that facilitates simulating quantum computing. The system 400 comprises the input and output components 120 and 130, respectively, and a simulator 410 that is configured to translate quantum mechanics based instructions to rho calculus instructions that can be read and/or executed on a classical and/or quantum computer. The simulator 410 can include a mapping algorithm(s) between quantum mechanics and rho calculus. The mapping algorithm(s) can be utilized by the simulator 410 to facilitate translating received quantum mechanics base computer instructions and/or models to a rho calculus based computer readable and/or executable representation that can be executed by a classical computer to simulate a quantum computer. The following provides a sample of exemplary mapping between rho calculus and Hilbert space (quantum mechanics space) that can be employed in various aspects of the invention to translate quantum mechanics instructions to a form of rho calculus that is executable by a classical computer and can program a quantum computer. The samples include grammar that can translate vectors, scalars, dual vectors and operators in Hilbert space to processes, names (quoted processes) and quote maps in the rho calculus domain.

In rho calculus, the symbol <> can be defined to represent a quote map. This quote map can be utilized to generate a name from a PROC, wherein a PROC can be defined as a set of processes generated by process algebra grammar. Thus, <>: PROC→<PROC>, wherein <PROC> can be referred to as a set of names generated by process algebra grammar. It is to be appreciated that the foregoing quote map is only one of an essentially infinite family of maps, for example, of the form $<>_K$: PROC→<PROC>.

A set of contexts (K) can be described through the following syntax:

K::=□, where □ represents a hole;
x(x).K (αx.K for the symmetric case);
lift x.K (lift α.K for the symmetric case);
K|P which can be derived by replacing P with K in the following rho calculus:

P::=0;
x(x).P;
lift x.P;
P|P

Defining $K[P] ≜ K\{P/□\}$ and substituting K for P, then for respective context, K can define an associated quote map $<>_K$:Proc→<Proc> by utilizing $<P>_K ≜ <K[P]>$. The following can then be employed to render an algebra on this family of maps: $<>_{K1} \cdot <>_{K2} ≜ <>_{K2 \circ K1}$, which can be represented as PROC*.

Vectors can be defined through the following notation: |P>. With this notation, processes can be interpreted as physical states. Respective states can be associated with corresponding duals <P|, denoting <>P⊥□, wherein P⊥ can be defined as the transpose of P. Vector addition can be defined through the following: |P>+|Q>≜|P|Q>; and <P|+<Q|≜<P|Q|. For the inner product, an operation I:PROC* x PROC→<PROC> is defined by I(<P|,|Q>)=$<Q>_{P⊥}$. Dirac notation can be utilized, wherein duals are referred to as bras and vectors are referred to as kets, and the inner product can be expressed as <P|Q>.

There are at least two orderings on scalars. These orderings are the following: <P>≺<Q>⇔<Q simulates P; and <P>≺'<Q>⇒P simulates Q. Scalar multiplication can be defined as <P><Q>≜<P|Q>.

The vectors described above can additionally be multiplied by scalars as follows: <R>|P>≜|P>{<>x<|R>/X}<>; and <R><P|≜<P>{<>x<|R>/X}<|. Thus, <R>(|P>+|Q>)=<R>|P>+<R>|Q> and $<R_1>(<R_2>|P>)=(<R_1><R_2>)|P>$. Since this is tractable and an intuitive extension to $≡_N$ that renders <>x<|0>≡$_N$x, <0>|P>=|P>. In addition, when Ω is defined to be a process such that for all P∈<PROC>, Ω simulates P. Thus, for any P, Ω|P=Ω. Furthermore, |P>{<>x<|Ω>/x}<>0 because it shares no name with any other process in <PROC>α for any α. If <Ω> is defined as zero, this becomes a second ordering.

In general, an operator on a physical state is any map, A, of type A: PROC→PROC that respects process structure. Duality extends operators so that if A is an operator, then A*:PROC→PROC*. Dyads are a special class of operators of the form, |P><Q| with action on vectors defined by (|P><Q|)R ≜(<Q|R>)|P> and <R(|P><Q|) ≜(<R|P>)<Q|. A projector is a dyad of the form |P><P|.

Orthogonal vectors P, Q can be defined as P⊥Q, if <P|Q>=<Ω>. A set of vectors {|P$_α$>} form an orthonormal basis if P$_α$⊥Q$_β$ when α≠β. Every operator A can be expressed as a linear combination of the projectors $|P_\alpha><P_\alpha|$. For example, $A=\Sigma_\alpha<R_\alpha>|P_\alpha><P_\alpha|$.

A type T is a physical property when there exists a $|P>$ such that P:T. The projector $|P><|$ is a mechanism for verifying the physical property T. For example, for a state $|Q>$, $(|P><P|)|Q>=(<P\perp|Q>)|P$. Thus, when $P\perp|Q\approx 0$, $|Q$ has the property T, and when $P\perp|Q\approx\Omega$, $|Q$ does not have the property T.

As noted above, the foregoing provides a sample of exemplary mapping between rho calculus and Hilbert space (quantum mechanics space) that can be employed in various aspects of the invention to translate quantum mechanics instructions to a form of rho calculus that is executable by a classical computer and can program a quantum computer. Thus, the foregoing mapping between Hilbert space and rho calculus space can be utilized with the systems 100-300 described in connection with FIGS. 1-3 described in detail above. In addition, it is to be appreciated that this mapping can be utilized with subsequently described systems and methods.

The following paragraphs illustrate additional exemplary rho calculus that can be utilized in accordance with various aspects of the present invention. Depicted are grammar, structural equivalence, name equivalence, substitution, operational semantics, replication, name service, resource control and representing DOCs as PROCs. It is to be appreciated that the listed calculus is not all-inclusive or exhaustive.

The following provides an overview of exemplary rho calculus grammar.

P::=0
  x[x]
  x(x).P
  lift x.P
  P|P
  >x<
X::=<P>

The calculation of free names of a process P denoted FN(P) can be given recursively by the following:

$FN(0)=0$ $FN(x[y])=\{x,y\}$ $FN(x(y).P)=\{x\}\cup(FN(P)\setminus\{y\})$ $FN(\text{lift } x.P)=\{x\}\cup FN(P)$ $FN(P|Q)=FN(P)\cup FN(Q)$ $FN(>x<)=\{x\}$ PROC can denote a set of processes (as described above), wherein structural equivalence can be defined by: $\equiv\subseteq$ PROC x PROC, which is the smallest equivalence relation respecting:

$P|0\equiv P\equiv 0|P$ $P_0|P_1\equiv P_1|P_0$ $(P_0|P_1)|P_2\equiv P_0|(P_1|P_2)$ <PROC> can denote a set of names (as described above), wherein name equivalence can be defined by: $\equiv_N\subseteq$ <PROC>x <PROC>, which is the smallest equivalence relation respecting: $x\equiv_N<>x<>$.

Substitution generally is a map, s:<PROC>→<PROC>, and $\{<Q>/<P>\}$ can denote a map that sends <P> to <Q> and is identity elsewhere. Thus, $x\{<Q>/<P>\}=<Q>$ if $x\equiv_N<P>$, x otherwise. A substitution, s, can be uniquely extended to a map, >s<:PROC→PROC by the following recursive definition:

$0>\{<Q>/<P>\}<\triangleq 0$ $(R|S)>\{<Q>/<P>\}<\triangleq (R)\{<Q>/<P>\}<)|(S>\{<Q>/<P>\}<)$ $(x(y).R)>\{<Q>/<P>\}<\triangleq x\{<Q>/<P>\}(z).\ (R>\{z/y,<Q>/<P>\}<)$ $(x[y])>\{<Q>/<P>\}<\triangleq x\{<Q>/<P>\}[y>\{<Q>/<P>\}]$ $(\text{lift } x.R)>\{<Q>/<P>\}<\triangleq \text{lift } x\ \{<Q>/<P>\}.\ (R>\{<Q>/<P>\}<)$ $(>x<)>\{<Q>/<P>\}<\triangleq Q$ if $x\equiv_N<P>$, $>x<$ otherwise wherein $(x)\ \{<Q>/<P>\}\triangleq <Q>$ if $x\equiv_N<P>$, x otherwise and z can be chosen distinct from the names in R, <P> and <Q>.

Operational semantics can be defined by a reduction relation, $\rightarrow\equiv\subseteq$ PROC x PROC, recursively specified by the following rules:

$comm.: \overline{x_0[x_2]\ |\ x_0(x_1)\cdot P \rightarrow P\{x_2/x_1\}}$ $\text{lift } \overline{\text{lift } x\cdot P \rightarrow x[<P>]}$ $par: \dfrac{P_0 \rightarrow P_1}{(P_0|P_2 \rightarrow P_1|P_2)}$ $equiv: \dfrac{(P_2 \equiv P_0\quad P_0 \rightarrow P_1\quad P_1 \equiv P_3)}{(P_2 \rightarrow P_3)}$ Replication can be defined by the following: P!=lift x.(x(y),(>y<|x[y])|P)|(x(z).(>z<|x[z]). A name service can be defined by the following recursive equation: N(I,x,f,r)=f(b). r(s).lift b.(<0>[<0>]|>s<)+x(y).r(s).(lift r.(y[<0>]|>s<)|N(i,x,f,r))+i(y).(lift r.(y[<0>])|N(i,x,f,r)). Recursion can be interdefinable with !, and choice can be implemented with par (e.g., with pairing). Resource control can be defined by x::=<P>, #<P>≤k, and DOCs can be represented as PROCs through the following:

P::=0
  x[z]
  x(y).P
  lift x.P
  P|P
  >x<
x::=<P>
y::=<P> such that P:T and T is a type in a system that selects for pattern matchers
z::=<P> such that P:U and U is a type in a system that selects for values A symmetric version of rho calculus can be defined with the following grammar:

P::=0
  αx.P
  lift α.P
  P|P
  >x<
  x=x
α::=x
  -x
x::=<P>

Operational semantics for the symmetric version can be defined by a reduction relation, $\rightarrow = \subseteq PROC \times PROC$, recursively specified by the following rules:

comm.: $xy.P|-xz.Q \rightarrow P|y=z|Q$ lift: lift $\alpha.P \rightarrow \alpha[<P>]$ par: $P \rightarrow P' \Rightarrow$ $P|Q \rightarrow P'|Q$ equiv: $P \equiv P'$, $P' \rightarrow Q'$, $Q \equiv \rightarrow Q \Rightarrow$ $P \rightarrow Q$.

The transpose of P (P⊥) can be defined recursively by the following:

$0\perp \triangleq 0$ $(\alpha x.P)\perp \triangleq -\alpha x.(P\perp)$ $(\text{lift } \alpha.P)\perp \triangleq \text{lift } -\alpha.(P\perp)$ $(P|Q)\perp \triangleq P\perp|Q\perp$ $(><P><)\perp \triangleq ><P\perp><$ $(x=y)\perp \triangleq x=y$ $--x \triangleq x$.

Figure 5:
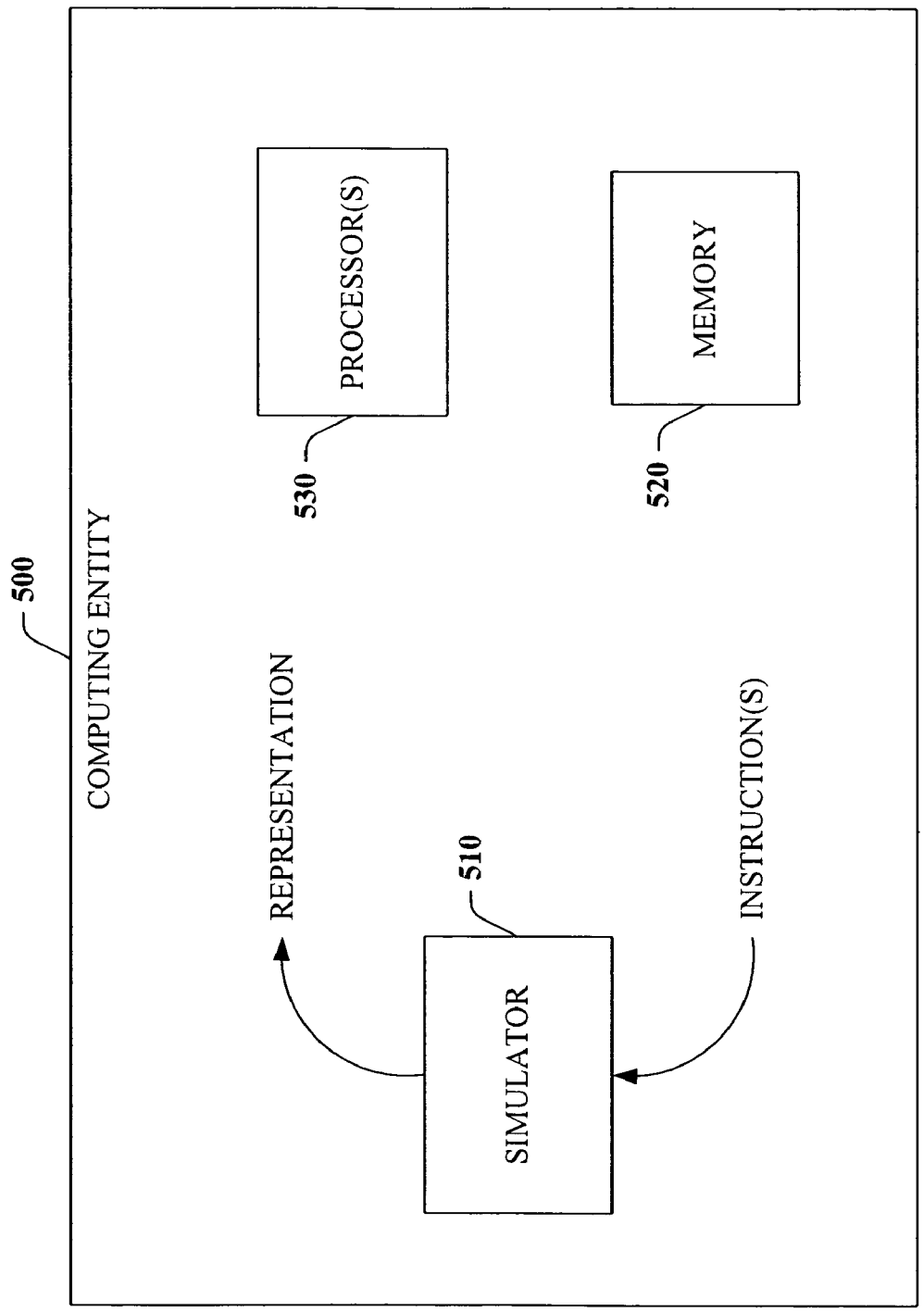
FIG. 5 illustrates an exemplary classical computing entity that utilizes a simulator to generate executable representations of quantum mechanics instructions.

FIG. 5 illustrates an exemplary classical computing entity 500 that utilizes a simulator to generate executable representations of quantum mechanics instructions. The classical computing entity (hereafter entity) 500 comprises a simulator 510, which can be substantially similar to the simulators described herein.

The entity 500 (e.g., any state machine such as a computer) can receive quantum mechanics based as well as other instructions through various mechanisms. For example, a user of the entity 500 can deploy a programming environment (e.g., editing, debugging, compiling, etc.) that utilizes the processing resources of the entity 500. From this environment, the user can generate, test, debug, etc. instructions (e.g., machine, assembly, C, derivatives of C, Visual Basic, Pascal, Fortran, etc.). In another exanple, such instructions can be downloaded, uploaded, and/or transferred to the entity 500. For example, the instructions can be conveyed over a network (e.g., a wire or wireless LAN, WAN, CAN, MAN, HAN, etc.) or bus from a server, a client, Flash memory, CD, DVD, optical disk, floppy disc, etc.

The entity 500 can store such instructions in the memory 520. It is to be appreciated that the memory 520 can be volatile and/or non-volatile memory as described herein. Additionally or alternatively, the entity can provide the instructions to the simulator 510 to generate a computer readable representation that is executed by a processor of the classical computer to simulate a quantum computer. As described in detail above, the simulator 510 can optionally employ a translator (not shown), mapping component (not shown) and/or a LUT (not shown) to facilitate generating the representation.

Upon receiving instructions, the simulator 510 can facilitate determining the present configuration of the instructions. For example, the instructions can be provided as quantum physics based instructions. The simulator 510 can utilize this information to obtain a suitable mapping from quantum mechanics to process algebra (e.g., rho, pi, join, ambient, etc.). For example, the simulator 510 can locate a suitable mapping algorithm or look up table and employ the algorithm or look up table to translate the instructions into a process algebra representation of the instructions. Such algorithm can provide a translation from Hilbert space as utilized with quantum mechanics to rho calculus space, for example. By way of illustration, the algorithm or look up table can provide a translation between Hilbert space vectors, scalars, and/or operators to rho calculus processes, names, quote maps, sum of triples, etc.

Generated representations can be conveyed from the simulator to the memory 520 wherein the representations can be stored for subsequent execution by a processor(s) 530. Additionally or alternatively, the representations can be provided to the processor(s) 530 for execution. The processor can be essentially any processing unit such as a microprocessor, a dedicated digital signal processor (DSP), a system CPU, etc. It is to be appreciated that such processing can provide a result substantially similar to a result generated by a quantum computer and/or predicted through quantum mechanics. Thus, the present invention can transform a classical computer to a quantum computer simulator.

Figure 6:
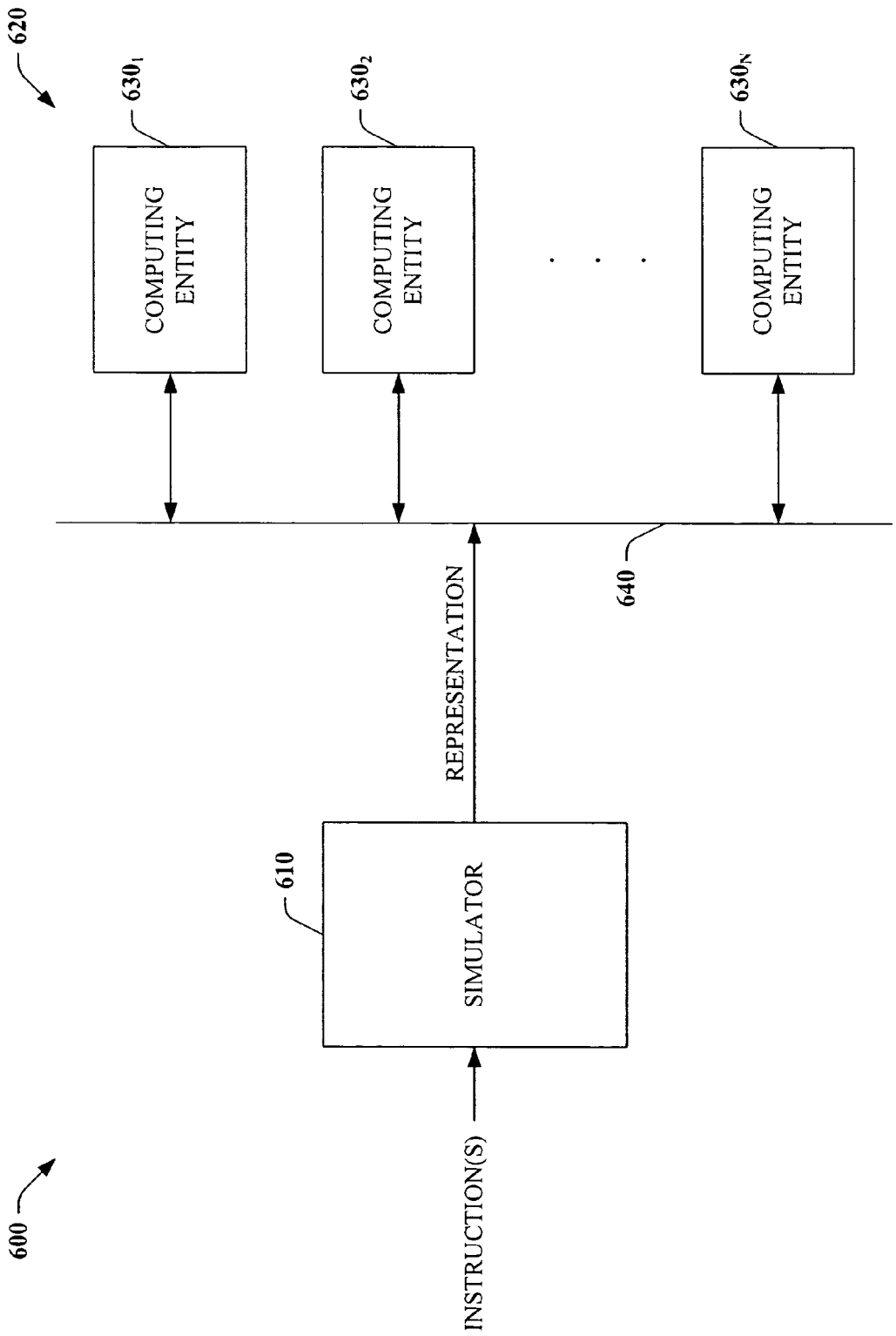
FIG. 6 illustrates an exemplary distributed quantum computer simulator.

FIG. 6 illustrates an exemplary distributed quantum computing system 600. The distributed quantum computing system (hereafter system) 600 employs a simulator 610 as described herein. As depicted, the simulator 610 can reside outside of a distributed computer network 620 and communicate with distributed computing entities $630_1$-$630_N$ (where N is an integer greater than or equal to one) associated with the distributed computer network 620 via communication channel(s) 640. As such, the simulator 610 can receive instructions (e.g., quantum physics based instructions), generate a process algebra (e.g., rho calculus) based representation of the instructions, and provide the representation to one of more of the computing entities $630_1$-$630_N$ (hereafter collectively referred to as computing entities 630). For example, the representation can be delineated across computing entities 630 for simulated distributed quantum processing. In another example, the representation can be provided to the computing entity with suitable processing resources, with the least present load, as specified by a user, based on an availability basis, etc.

Although depicted outside of a computing entity, it is to be appreciated that the simulator 610 can reside within a computing entity such as one of the computing entities 630 or other entity/machine/server. In addition, it is to be appreciated that more than one simulator 610 can be utilized in connection with the system 600. When multiple simulators 610 are employed, respective simulators can service a subset of the computing entities 630. For example, the computing entities 630 can be delineated across simulators 610. In another example, the simulators 610 can concurrently service one of the computing entities 630. Thus, two simulators 610 can translate disparate sets of instructions or portions of a similar set of instructions for a similar computing entity.

Figure 7:
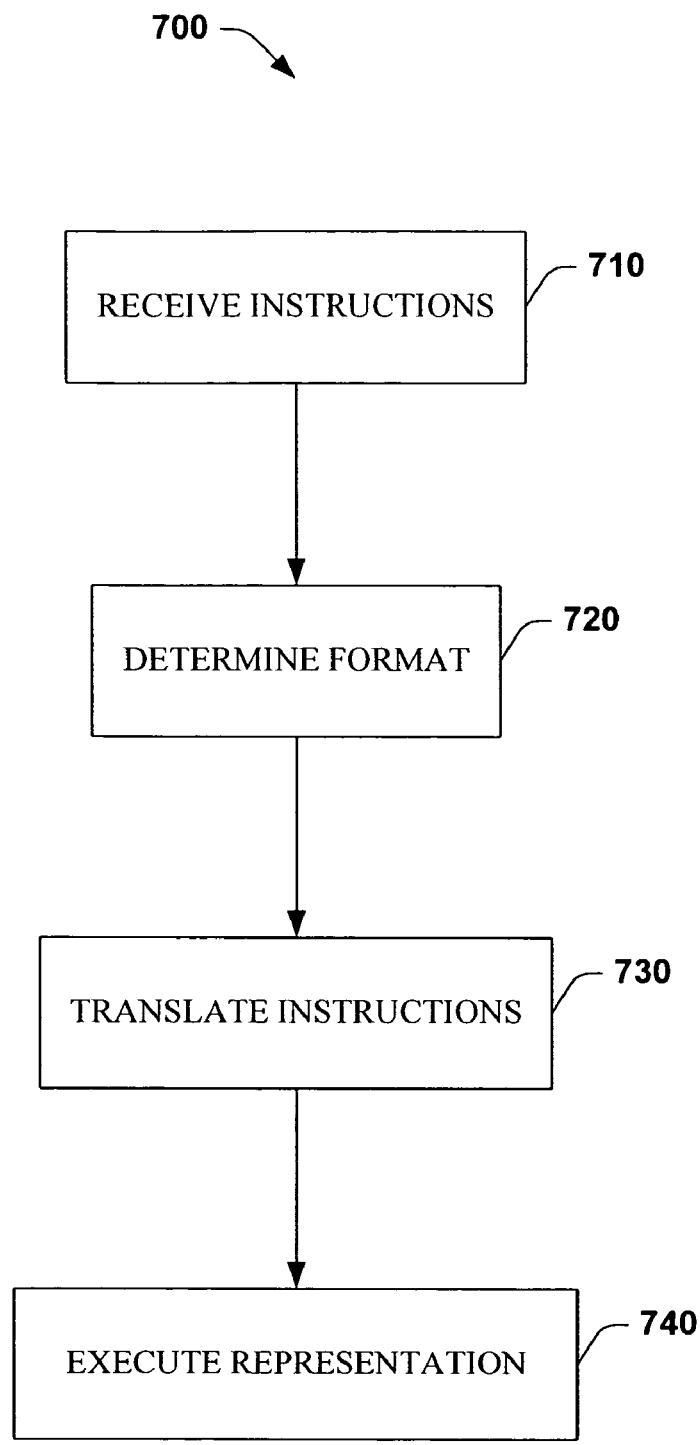
FIG. 7 illustrates an exemplary methodology that facilitates quantum computing simulation.
Figure 8:
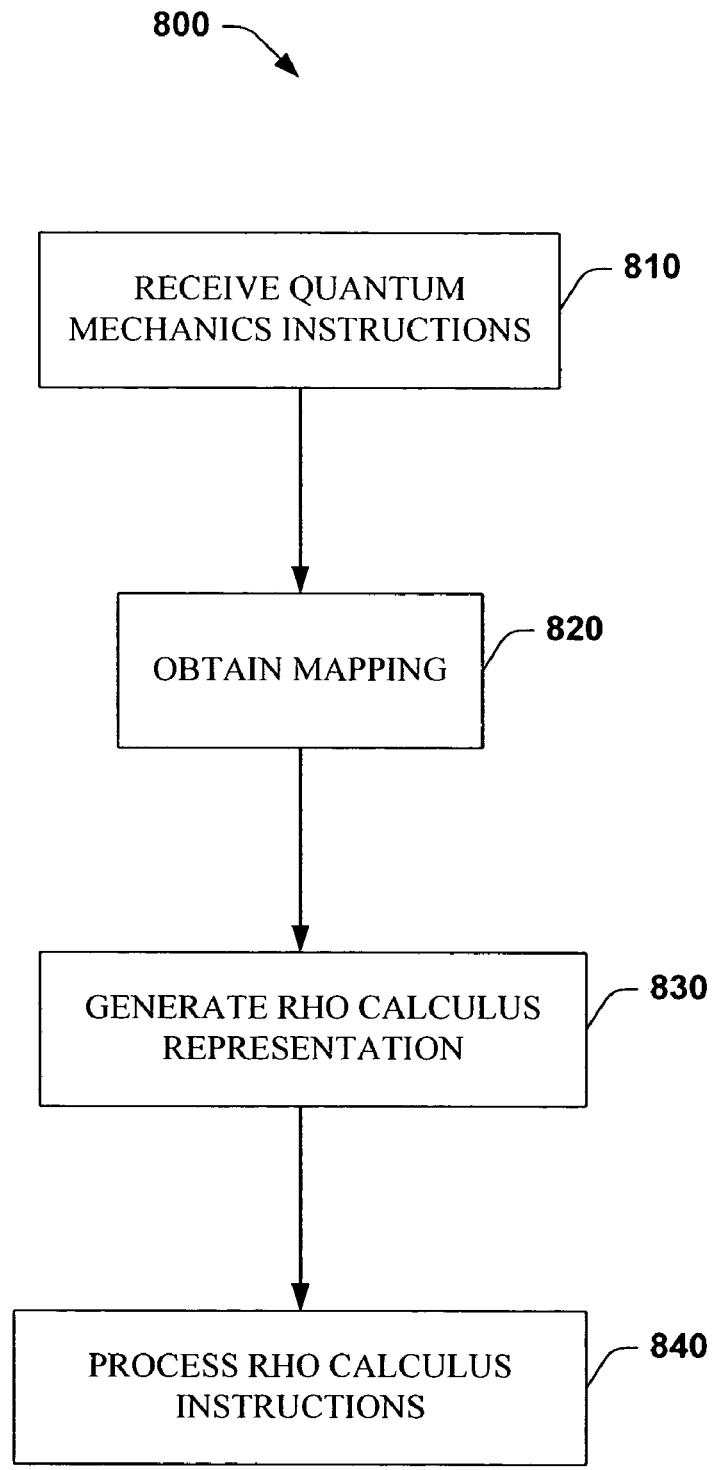
FIG. 8 illustrates an exemplary methodology for simulating a quantum computer with a classical computer via process algebra.
Figure 9:
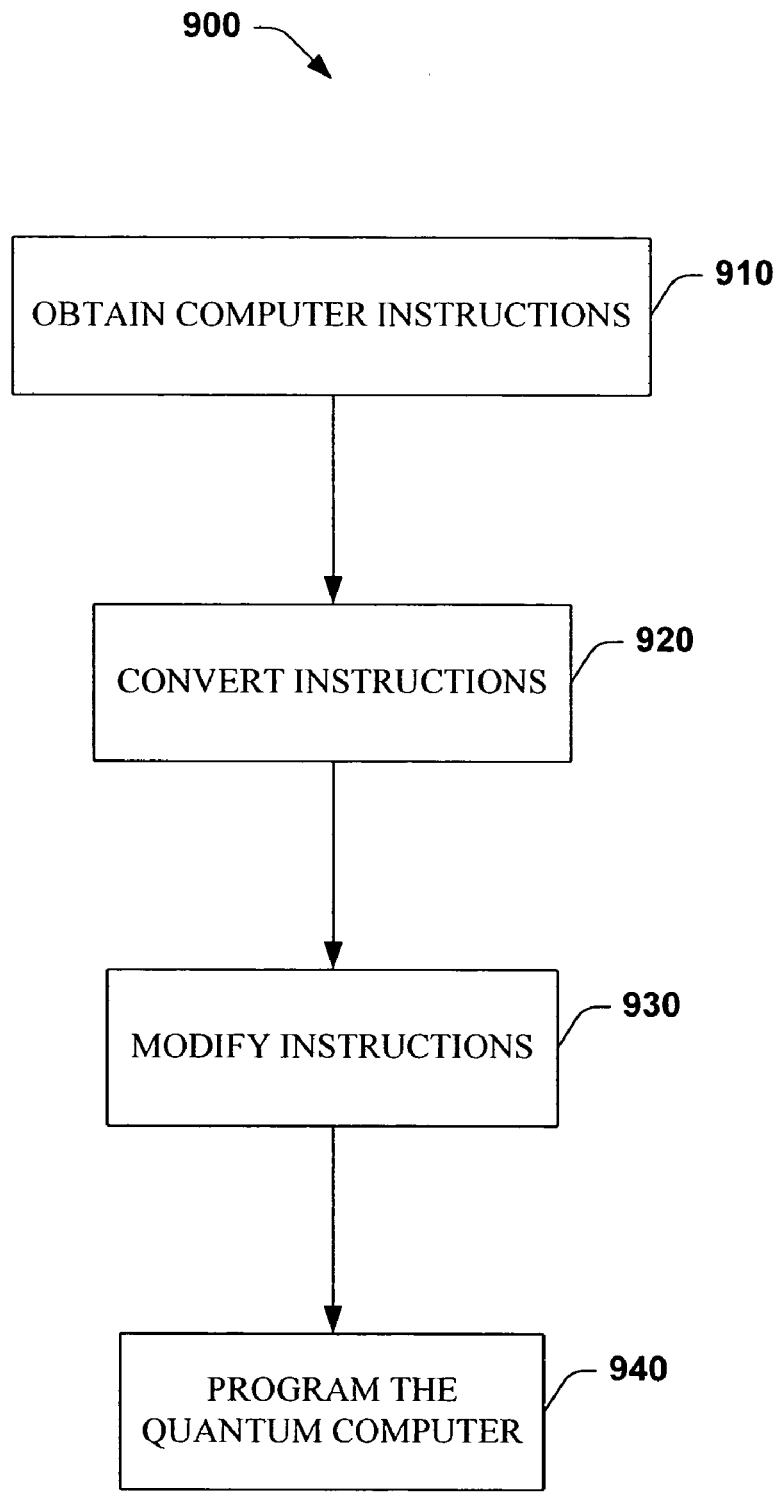
FIG. 9 illustrates an exemplary methodology for programming a quantum computer with process algebra.

FIGS. 7-9 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 7 illustrates a methodology 700 that facilitates quantum computing simulation. The methodology 700 can be implemented in connection with a classical computer to simulate a quantum computer. At reference numeral 710, computer readable instructions such as instructions generated via machine language, assembly language, higher-level languages, quantum mechanics, etc. can be received. Such instructions can be received over a bus or network, depending on the source of the instructions. For example, instructions stored within a classical computer (e.g., in memory) can be obtained through a local or system bus. In another example, the instructions can be uploaded, downloaded from various storage medium such as CD, DVD, optical disc, floppy disk, etc. In yet another example, the instructions can be created via a programming studio that includes an editor, debugger, compiler, etc. In still another example, the instructions can be located remotely from the classical computer and conveyed to the classical computer over a network such as a LAN, a WAN, a CAN, a MAN, a HAN, etc. from a quantum computer, a quantum computer simulator, a client, a server, a database, a web page, a web service, etc.

At reference numeral 720, the format of the instructions can be identified. For example, it can be determined whether the instructions are based on quantum physics, C, machine language, etc. At reference numeral 730, the instructions can be translated to a computer readable and/or executable representation that can execute on a classical computer to simulate a quantum computer. For example, the representation can be based on process algebra such as rho or pi calculus. At 740, the generated representation can be conveyed for further processing such as execution by a processor of the classical computer, for example. It is to be appreciated that such processing can provide a result substantially similar to a result generated by a quantum computer and/or predicted through quantum mechanics.

FIG. 8 illustrates a methodology 800 for simulating a quantum computer with a classical computer. At reference numeral 810, quantum physics based instructions are received. At 820, a mapping between quantum physics (Hilbert space) and rho calculus is obtained. Such mapping can include translations between vectors, scalars, dual vector and operators in Hilbert space to processes, named processes (quoted names) and quote maps in process algebra space. At 830, the mapping is utilized to map the quantum mechanics based instructions to rho calculus based instructions. At 840, the rho calculus based instructions are executed by a classical computer. Such execution provides results similar to results executed on a quantum computer and/or predicted with quantum physics.

FIG. 9 illustrates a methodology 900 for programming a quantum computer. At reference numeral 910, computer instructions can be obtained. Such instructions can be quantum mechanics based, for example. As such, these instructions can execute on the quantum computer. However, these instructions can be converted to an efficient and user-friendly programming language that can be utilized to program the quantum computer. Alternatively, these instructions can be initially generated in the efficient and user-friendly programming language. At reference numeral 920, the instructions can be converted to process algebra (e.g., rho calculus) based instructions, if not already in a process algebra form. At reference numeral 930, the process algebra instructions can be modified. For example, a user can add, delete, alter, modify, etc. one or more instructions in order to produce a desired result when the instructions are executed. At 940, the process algebra based instructions can be utilized to program a quantum computer. For example, the process algebra instructions can be executed by the quantum computer or the process algebra instructions can be translated to quantum mechanics instructions, wherein the quantum mechanics instructions are executed by the quantum computer.

Figure 10:
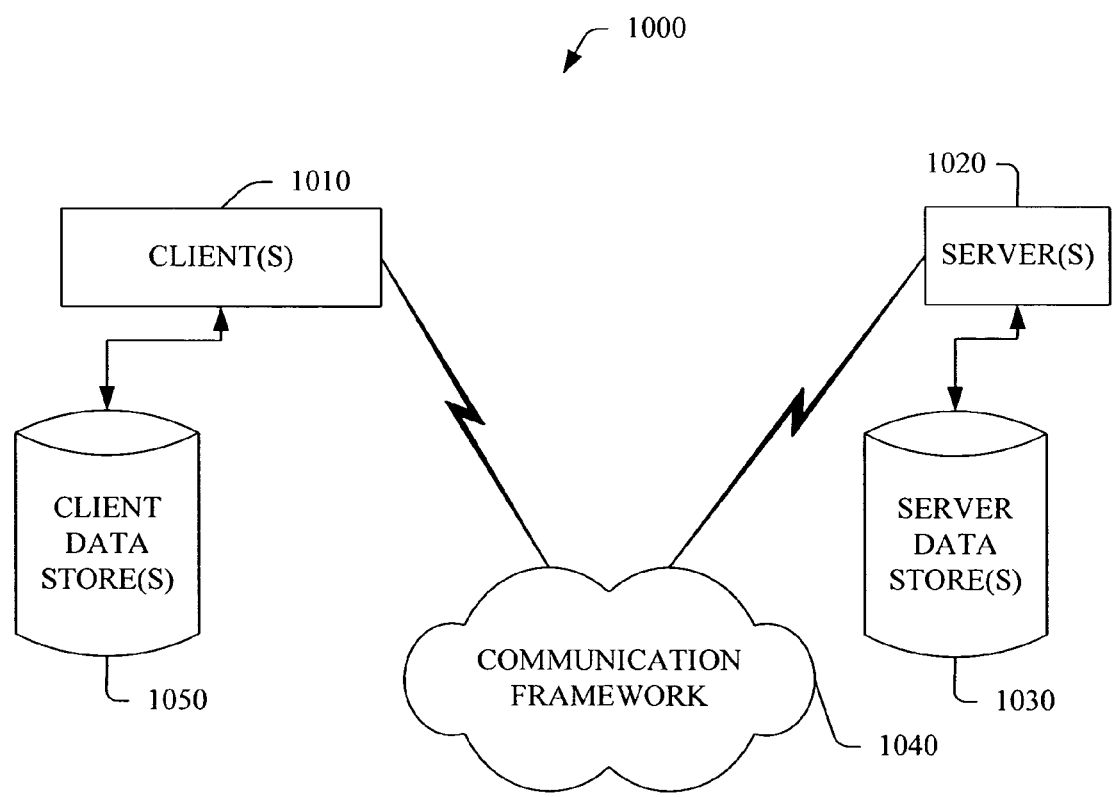
FIG. 10 illustrates an exemplary networking environment, wherein the novel aspects of the present invention can be employed.
Figure 11:
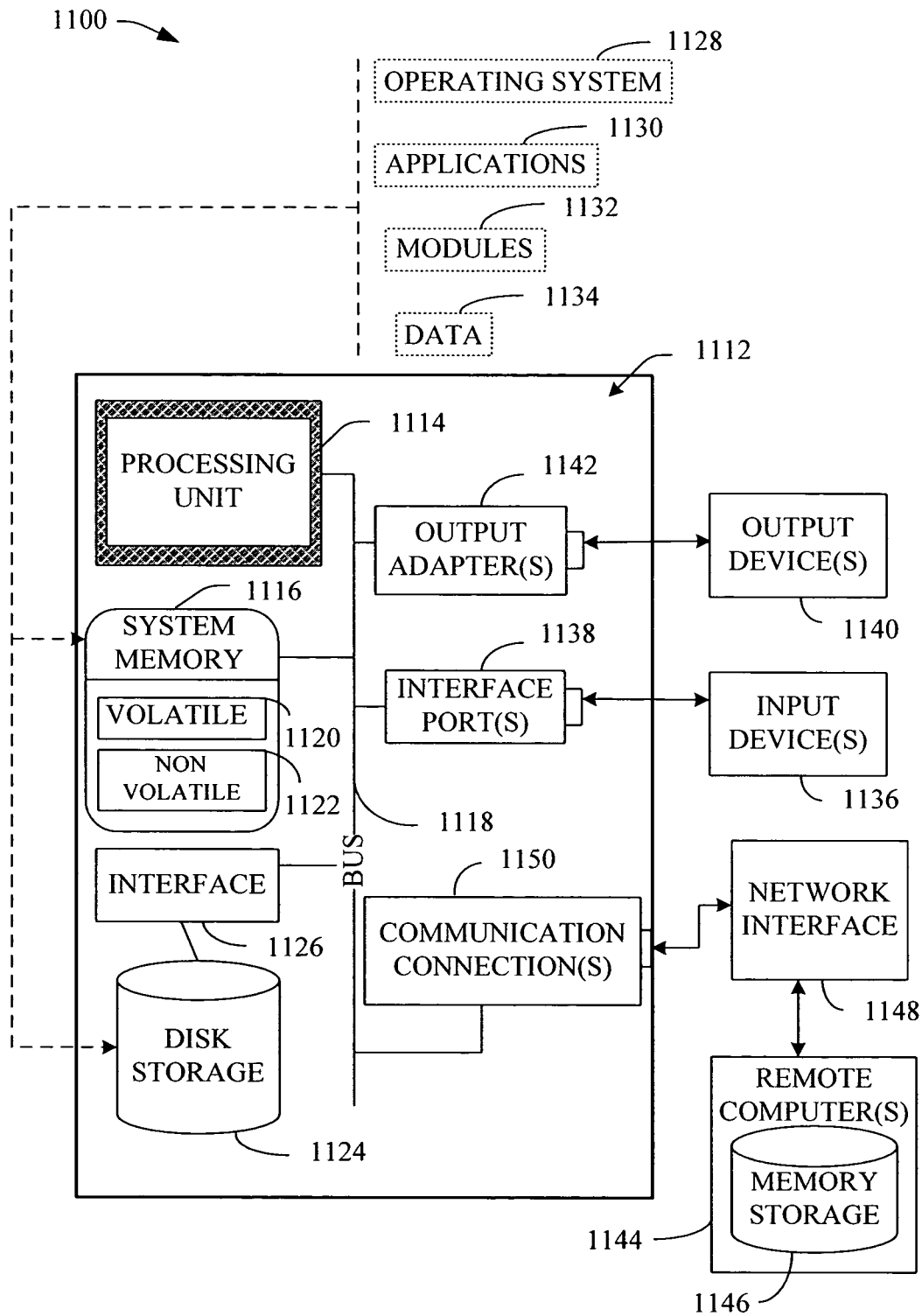
FIG. 11 illustrates an exemplary operating environment, wherein the novel aspects of the present invention can be employed.

In order to provide additional context for implementing various aspects of the present invention, FIGS. 10-11 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the present invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro- Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates simulation of a quantum computer within a classical-physics based computer comprising following components stored within memory of a classical computer:
   a first component that receives an instruction set that includes at least one quantum mechanics based instruction; and
   a second component that translates the quantum mechanics based instruction set to a computer readable representation based on rho ($\rho$) calculus that is executed by a classical physics based computer to produce a result indicative of a quantum computer by providing a relationship between vectors, scalars, duals and operators in Hilbert space and processes, quoted names and quote maps respectively in rho calculus space.

2. The system of claim 1, wherein the relationship is a transformation between Hilbert space and rho calculus space.

3. The system of claim 1, wherein the relationship is provided as a look up table.

4. The system of claim 1, wherein the representation is utilized to program a quantum computer.

5. The system of claim 1, further comprising an Application Program Interface (API) that enables a user to create or edit the instruction set and representation.

6. The system of claim 1 is implemented within the classical physics based computer.

7. The system of claim 1 is employed to facilitate quantum computer simulation across a plurality of distributed classical computers.

8. The system of claim 1, further comprising a debugging component that scrutinizes the rho calculus based representation and resolves any discrepancies.

9. A method that facilitates quantum computer simulation, comprising:
   obtaining one or more quantum mechanics based computer readable instructions; and
   utilizing the received instructions to generate a set of instructions based on rho calculus the rho calculus based instructions transform a classical physics based computer into a quantum computer simulator that produces at least a result indicative of a quantum computer by translating vectors, scalars, duals and operators in Hilbert space associated with the received instruction set to processes, quoted names and quote maps respectively in rho calculus space.

10. The method of claim 9, further comprising executing the the rho calculus based set of instructions on the classical physics based computer to produce a simulated quantum computer result.

11. The method of claim 9, further comprising employing a mapping between Hilbert space and process algebra space to generate the set of instructions from the received instructions.

12. A method for programming a quantum computer, comprising:
   generating rho calculus computer readable instructions;
   converting the rho calculus computer readable instructions to quantum mechanics based instructions;
   converting processes, named processes and quote maps of process algebra to vectors, scalars, duals and operators respectively in quantum mechanics space; and
   employing the quantum mechanics based instructions to program a quantum computer.

13. The method of claim 12, further comprising utilizing the process algebra based instructions to program the quantum computer.

14. The method of claim 12, further comprising debugging the quantum computer by employing a debugging component that resolves discrepancies in the rho calculus computer readable instructions.

15. A computer readable medium storing computer executable components that facilitate simulation of a quantum computer, comprising:
   a component that receives quantum mechanics based instructions; and
   a component that transforms the received instructions to computer readable rho calculus instructions by translating vectors, scalars, duals and operators in Hilbert space associated with the received instruction set to processes, quoted names and quote maps in rho calculus space, wherein the computer readable rho calculus instructions are processed by a classical computer to simulate a quantum computer.

16. A system that facilitates managing processing resources, comprising:
   means for receiving quantum physics based computer instructions stored in a classical computer memory;
   means for transforming the quantum mechanics based computer instructions to a rho calculus representation by translating vectors, scalars, duals and operators in Hilbert space associated with the received instruction set to processes, quoted names and quote maps in rho calculus space; and
   means for simulating a quantum computer on a classical computer by executing the rho calculus representation to produce a quantum computer simulated result.

17. The system of claim 16, further comprising means for employing the rho calculus representation to program a quantum computer.

* * * * *